Patented May 3, 1938

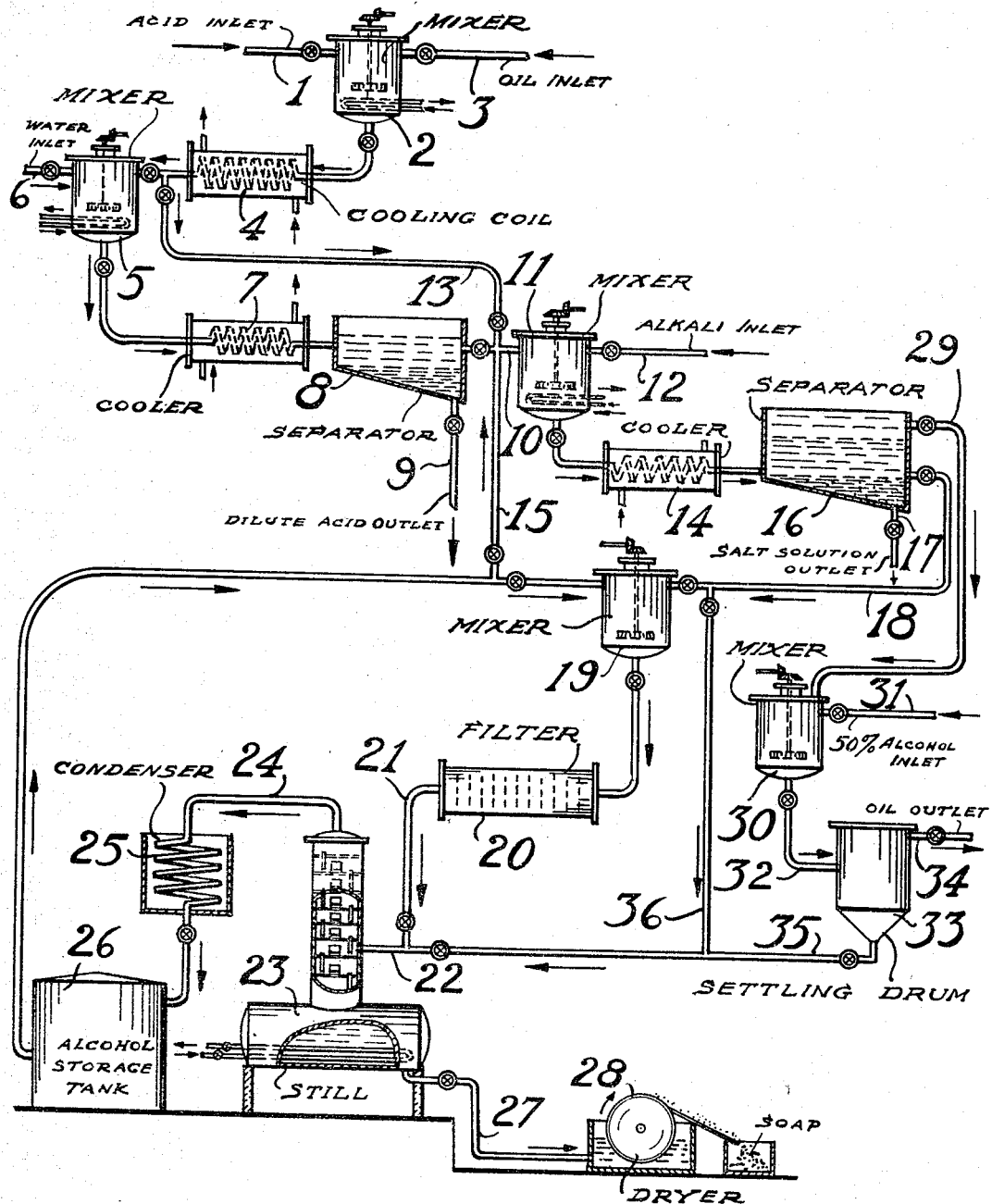

2,115,847

UNITED STATES PATENT OFFICE 2,115,847

PROCESS FOR TREATING OILS WITH SULPHURIC ACID AND FOR PREPARING IMPROVED WETTING AGENTS AND DETERGENTS

Edwin J. Gohr, Elizabeth, N. J., assignor to Standard Oil Development Company, a corporation of Delaware Application November 9, 1934, Serial No. 752,284

7 Claims. (Cl. 260—99.12)

This invention relates to an improved method for treating oils with strong sulphuric reagents and for the preparation of improved products therefrom and relates more particularly to the treatment of hydrocarbon oils containing olefins with fuming sulphuric acid for the preparation of improved sulphuric derivatives which are useful as wetting agents and detergents.

In the treatment of olefins and unsaturated hydrocarbon oils such as acid-reactive crude oils and fractions thereof and cracked oils containing olefins, with strong or fuming sulphuric acid, considerable oxidation and polymerization ordinarily occurs with the formation of objectionable color bodies and resulting impairment in the quality of both the oil and the sulphuric derivatives obtained. These disadvantages are particularly noted when using fuming sulphuric acid as the treating agent.

It is an object of this invention to provide an improved process by which the above disadvantages are largely and in many instances even substantially completely avoided and by which improved products such as refined oil and sulphuric derivatives of high quality may be directly obtained without the necessity of subsequent refining operations to remove undesirable by-products of the acid treating process. These and further objects will be ascertained from the following description of the invention and the claims.

It has been proposed to conduct the acid-oil reaction at such low temperatures that these objectionable side reactions are inappreciable. This, however, requires considerable refrigeration due to the exothermic nature of the process.

It has now been discovered that this reaction, and the subsequent steps involved in the preparation and separation of the products, may be conducted at higher temperatures than would otherwise be possible if the time of reaction is suitably shortened. The rate of reaction of fuming sulphuric acid with olefines of more than about eight carbon atoms per molecule to form mono-alkyl sulphates, for example, has been observed to be substantially instantaneous. The time of contact required to complete the acid-oil reaction accordingly depends largely upon the rapidity and degree of intimacy obtained in the mixing of the reagents. It is desirable that this mixing be as rapid and complete as possible and that the reaction mixture be thereafter immediately neutralized or diluted to stop undesirable side reactions. While higher temperatures are permitted if the reaction is conducted under such conditions, it is still necessary to remove the exothermic heat of reaction in order to prevent overheating. Suitable means are accordingly provided for cooling the reaction mixture, either directly or indirectly. For example, the reagents may be contacted in a narrow stream flowing at high velocity over baffles and confined between externally cooled walls, or the mixing may be accomplished in a vessel of small capacity, such as a turbo mixer, and the resulting mixture passed directly into a cooling coil. The mixing vessel may also be cooled.

The drawing presents a diagrammatic illustration of one suitable method for carrying out this invention and illustrates the flow of materials.

A strong sulphuric treating reagent such as fuming sulphuric acid is supplied by line 1 to a mixer 2 which may be of any desired construction but is preferably arranged to provide for rapid and intimate admixture of the materials supplied thereto. The mixer, for example, can be a homogenizer, a colloid mill, etc. An acid-reactive oil such as pure or mixed olefins alone or in admixture with relatively inert carrying vehicles such as hydrocarbon oils, carbon tetrachloride, methyl alcohol, etc., is supplied through line 3. Both acid and olefinic materials are supplied to the mixer at preferably a temperature not higher than the maximum reaction temperature desired and either may suitably be cooled 10 to 40 degrees or more below this temperature. The mixing vessel may be supplied with cooling jackets, internal cooling coils or other means for removing the heat of reaction. The reaction mixture is preferably passed immediately through cooling coil 4 to remove the heat formed, and to prevent undue rise in temperature. The period during which the reaction mixture remains in the mixing vessel and in the cooling coil is conveniently considered as the time of contact of the reagents.

The reaction is stopped abruptly by passing the mixture from cooler 4 into a second mixing vessel 5 which may be similar to mixer 2 and which may also be provided with suitable cooling means. Water, preferably cooled to as low a temperature as possible, is supplied to mixer 5 by line 6 in sufficient amount to dilute the total free sulphuric acid and sulphuric anhydride to a final sulphuric acid strength (based on total free acid and water present) preferably of about 40 to 60%. (Of course, if the reaction is conducted in the presence of an inert solvent of high density, such as the chlorinated hydrocarbons, for example, carbon tetrachloride, dichlor and tetrachlor ethane, and the like, the amount of water added to dilute the sulphuric acid will be adjusted to cause separation of acid from the oil phase, and in the following separation the relative positions of the layers may be reversed.) The diluted mixture is passed immediately through cooler 7 to remove heat of neutralization and to prevent the temperature of the mixture rising unduly and is then passed into a gravity separating means 8, which may be a settling tank or centrifuge, where a lower aqueous layer of dilute sulphuric acid forms and is separately withdrawn by line 9 from an upper layer containing sulphuric derivatives of the olefins and any unreacted organic material. In using a centrifuge for this separation, the speed of separation permits somewhat higher dilution and separation temperatures if the mixture is passed into the centrifuge as quickly as possible after dilution. At least a part of the dilution may be accomplished by the addition of cold water, with mixing, at the centrifuge inlet, and water may even be sprayed on the surface of the rotating mixture in the centrifuge, preferably in the inlet zone of preliminary separation. It is then passed by line 10 into mixer 11 in which it is contacted with a neutralizing agent, preferably an aqueous solution of an alkali such as sodium or potassium hydroxide or carbonate or ammonia which is supplied by line 12. If it is not desired to recover the excess acid, the total reaction mixture without dilution may be passed by lines 13 and 10 directly into the mixer 11 and may be neutralized therein. The mixer 11 should also be provided with suitable cooling means or else the neutralized mixture should be passed immediately into an after-cooler such as cooler 14. The reaction mixture, after dilution and/or neutralization to remove excess strong acid and to prevent the formation of undesirable by-products, may then be treated in any desired manner for the separation of residual oil, sulphuric derivatives, and organic matter. The means described herein for accomplishing this separation are merely illustrative as it is recognized that numerous other methods and modifications of the described method can be used in substitution therefor. A water soluble alcohol which is preferably of 90 to 95% or higher concentration may be supplied by lines 15 and 10 as an aid in preventing the thickening of the mixture on neutralization and to aid in the subsequent separation of the neutralized products.

The neutralized mixture from mixer 11 passes into a second gravity separator 16 which may also be either a settling tank or a centrifuge. The nature and extent of the separation occurring in separator 16 is influenced by the amount and concentration of the alcohol present. If sufficient concentrated alcohol is added to give a resulting concentration of about 10 to 50% soap in the alcohol, three layers are formed, namely a lower or heavier layer of a saturated aqueous salt solution containing most of the sulphates, a middle alcoholic solution of the neutralized sulphuric derivatives or "soaps", and an upper or lighter layer consisting of unreacted oil containing some soap and alcohol. The lower layer of aqueous salts is separately withdrawn by line 17. The middle layer of alcoholic soap solution is passed by line 18 into mixer 19 where it is mixed with sufficient additional concentrated alcohol to raise the alcohol concentration of the mixture (based on total alcohol and water present) to above 80%. This causes the precipitation of substantially all the remaining inorganic salts which may be removed by suitable separation means 20 which may be either a filter and centrifuge or other suitable apparatus. The alcoholic solution of soap is then passed by lines 21 and 22 into still 23 from which most of the alcohol is removed as distillate by line 24. This alcohol distillate is condensed in condenser 25 and passed to storage 26 from which it may be drawn for repeated use as already described. The distillation residue, consisting of a thick solution or slurry of the soaps in water which may contain some undistilled alcohol, is passed by line 27 to a suitable drying means such as drum dryer 28. The soaps may also be dried in a spray dryer by atomization into a heated current of inert gases or air, or may be dried more slowly in cake form or in any other desired manner.

The upper oil layer from settler 16 may be passed by line 29 into mixer 30 in which it is agitated with a 50% aqueous alcohol solution supplied by line 31. The mixture then passes by line 32 into settling means 33 which may be either a tank or a centrifuge, in which an upper layer of oil separates from a lower aqueous alcohol layer containing substantially all the soaps and alcohol originally present in the oil. The oil is withdrawn by line 34 and may be distilled to recover traces of alcohol therefrom and may be subjected to any additional refining and fractionation steps considered desirable for the production of a finished oil. The lower or heavier aqueous alcohol solution is passed by lines 35 and 22 into the still 23.

If desired, as in the production of a crude commercial grade of soap containing inorganic salts, only sufficient alcohol may be added by line 15 to break the emulsion formed on neutralization.

In this case only two layers form in separator 16, namely, a lower aqueous alcoholic solution of soap and inorganic salts and an upper oil layer containing a small amount of soap and alcohol. The upper layer may be processed as described above and the lower layer may be passed directly into still 23 by lines 18, 36, 35 and 22, bypassing mixer 19 and filter 20.

The present invention may be applied generally in the refining of oils to substantially any oil containing acid reactive components such as petroleum oils and lubricating fractions thereof and more particularly cracked oils. It is of especial application in the preparation of high quality detergents and wetting agents which are insensitive to hard water, from olefins of about 8 to 22 or more carbon atoms per molecule, preferably having the carbon atoms connected in a straight chain and having the double bond at or near the end thereof. Organic compounds containing an olefinic linkage, such as unsaturated fatty alcohols, for example, oleyl alcohol, and unsaturated fatty acids, such as oleic acid, may also be treated according to the process of this invention. Detergents can also be prepared according to the present invention from cracked paraffinic hydrocarbons and mixtures thereof such as paraffin wax and petrolatum, described in copending application, Serial No. 704,749, filed December 30, 1933, by William J. Sweeney. Wetting agents and detergents may be prepared by using the process of the present invention in treating cracked petroleum oils generally as described in copending application, Serial No. 752,-286, filed November 9, 1934, by Per K. Frolich, and wetting agents may also be prepared by the use of the present process in the refining of petroleum crudes and uncracked fractions thereof as described in copending application, Serial No.

752,313, filed November 9, 1934, by Raphael R. Rosen.

The use of the present invention for the preparation of high quality detergents, is illustrated in the following example:

Example

A fraction boiling between 350 and 600° F., specific gravity 0.75, obtained by the destructive distillation of paraffin wax at a pressure of about 30 lbs. per square inch, is mixed with 13.5 volumes of fuming sulphuric acid containing 20% by weight of sulphuric anhydride per 100 volumes of cracked wax. A stream of the cracked wax is brought continuously into contact, with agitation, by means of a driven propellor directed against baffles, with a stream of the fuming acid, the rate of supply of the latter being so adjusted as to maintain at all times a slight excess of sulphuric acid above that theoretically required for the formation of mono-alkyl sulphates with the total olefines present. Cooling is supplied to maintain a temperature of the reaction mixture of about 68° F. After a time of contact of 120 seconds the mixture is diluted in a second mixing vessel with sufficient water to produce a dilute sulphuric acid of about 60% strength, which is permitted to separate as a separate layer and is withdrawn. A temperature below 80° F. is maintained throughout this dilution step and the subsequent separation. Fifty volumes of isopropyl alcohol are then added and the mixture is neutralized with an aqueous solution containing 15 to 20% of sodium hydroxide with cooling to maintain the temperature at about 80 to 120° F. Three layers then are permitted to form on standing as described in the above description of the drawing. The middle layer of alcoholic soap solution is mixed with an equal volume of isopropyl alcohol and is then filtered to separate out the precipitated inorganic salts. The alcoholic filtrate is then reduced to dryness by evaporation and finally on a drum dryer thereby producing a yield of 40% (by weight of the oil treated) of a light colored salt-free soap of high detersive properties. A 0.2% solution of this soap in water is water-white in color and is a highly effective laundering agent in both hard and soft water and in sea water.

An even shorter time of contact than that shown in the above example may be used. For example, even with this mixer a 36% yield of soap is obtained with a time of contact of 36 seconds, and even shorter times of contact are sufficient for maximum yields with more efficient mixers and/or at higher reaction temperatures. It is ordinarily desirable that this time be kept below about 5 minutes and it is preferred that sufficiently efficient mixers be used to permit the reaction to be completed in not more than 1 to 2 minutes. The reaction temperature also affects the extent of side reactions and the quality of the products very materially and is inversely related to the time of contact in this effect. It is accordingly possible to operate at higher temperatures if the time of contact is made sufficiently short. For example, ordinary operations in which agitation is conducted for 30 minutes to an hour or longer in the preparation of detergents by treating cracked paraffin wax with fuming sulphuric acid must be conducted at temperatures below about 30° F. in order to obtain a product of equal quality to that obtained with a reaction temperature of 68° F. in the above example. Somewhat higher temperatures may be used without impairment in quality if the time of reaction is further shortened below the 2 minutes used in this example. It is generally undesirable to use reaction temperatures above about 100° F. in the preparation of detergents of high quality and light color from cracked wax and lower temperatures, say below 70° F., are ordinarily preferred. Cracked petrolatum and cracked hydrocarbon oils generally require somewhat lower reaction temperatures than cracked wax and their treatment is preferably conducted at temperatures below about 60 or 50° F. with times of reaction of 1 to 2 minutes. Of course, where crude products are desired and light color is not essential, higher reaction temperatures of 125 to about 175° F. may be used. The time of reaction in such cases is less than one minute and is preferably less than half a minute.

The use of a constant excess of acid during the treating reaction is no part of the present invention, but is described more fully and claimed in copending application, Serial No. 752,312 filed November 9, 1934 by Fulton and Vesterdal. If the treating conditions are such that an excess of olefines is present, resulting in the presence of unstable dialkyl sulfates in the final soap, the soap may be stabilized by limited hydrolysis or by boiling in the presence of dilute aqueous caustic soda, according to the process of copending application, Serial No. 722,838, filed April 28, 1934, by Fulton and Vesterdal, or by the addition of buffers to the soap or its solution according to copending application Serial No. 752,287 filed November 9, 1934 by Hyym E. Buc. It is also desirable to add a slight excess of an alkali to solutions of such soaps before drying the soaps, according to copending application Serial No. 704,790, filed December 30, 1933, by Hans S. Vesterdal.

The strength of acid may be adjusted as desired and is preferably selected so as to obtain an acid which is liquid at the treating temperature used; for example, about 10 to 25% sulphuric anhydride. While fuming acids of about 5 up to about 65% content of sulphuric anhydride may be used, it is generally unnecessary to use the stronger acids because of the desirability of maintaining at all times in the acid treating reaction an excess of sulphuric acid ($H_2SO_4$) above an equal molecular proportion of acid to olefin.

This invention is not to be limited to any specific description or examples which have been presented herein solely for purposes of illustration but is to be limited only by the following claims in which it is desired to claim all novelty insofar as the prior art permits.

I claim:

1. Process for the production of improved detergents, comprising intimately mixing fuming sulphuric acid with an acid reactive essentially aliphatic hydrocarbon oil of more than 8 carbon atoms for a period less than one minute while maintaining the temperature in the range from 30° to 175° F., immediately diluting with water to provide acid strength below 60%.

2. Process for the production of improved detergents, comprising intimately mixing fuming sulphuric acid with an acid reactive essentially aliphatic hydrocarbon oil of more than 8 carbon atoms for a period less than five minutes while maintaining a temperature in the range from 30° to 100° F., immediately diluting with water to provide acid strength below 60%.

3. Process for the production of improved detergents, comprising intimately mixing fuming sulphuric acid with an acid reactive essentially aliphatic hydrocarbon oil, boiling between 350° and 600° F., obtained by the destructive distillation of a paraffin wax, for a period of two minutes while maintaining the temperature of the reaction in the range from 30° to 68° F., immediately diluting with water to provide acid strength below 60%, separating the sulphuric acid derivatives from the diluted acid, while maintaining a temperature below 80° F. during the dilution and separation steps.

4. Process for the production of improved detergents, comprising intimately mixing fuming sulphuric acid with an acid reactive essentially aliphatic petroleum oil of more than 8 carbon atoms for a period less than ten minutes while maintaining the temperature in the range of 30° to 175° F., immediately diluting with water to provide acid strength below 60%, separating the sulphuric acid derivatives from the diluted acid and neutralizing with a suitable alkali.

5. Process in accordance with claim 4 in which said petroleum oil is a cracked paraffin of the class consisting of paraffin wax and petrolatum.

6. Process for the production of improved detergents comprising intimately mixing fuming sulphuric acid with an acid reactive essentially aliphatic hydrocarbon oil of more than 8 carbon atoms for a period less than one minute while maintaining the temperature in the range from 30° to 175° F., immediately reducing the concentration of the excess sulphuric acid to less than 60%.

7. Process in accordance with claim 1 in which the concentration of the excess sulphuric acid is reduced by neutralization.

EDWIN J. GOHR.